US005080841A

United States Patent [19]

Nishio

[11] Patent Number: 5,080,841

[45] Date of Patent: Jan. 14, 1992

[54] HOT ISOSTATIC PRESSING METHOD

[75] Inventor: Hiroaki Nishio, Tokyo, Japan

[73] Assignee: NKK Corporation, Tokyo, Japan

[21] Appl. No.: 538,442

[22] Filed: Jun. 15, 1990

[30] Foreign Application Priority Data

Jun. 16, 1989 [JP] Japan .................................. 1-152132

[51] Int. Cl.[5] ........................................ C04B 35/64

[52] U.S. Cl. .................................... 264/40.6; 264/65; 419/42; 419/49

[58] Field of Search .................... 264/40.6, 57, 58, 65; 419/42, 49

[56] References Cited

PUBLICATIONS

American Ceramic Bulletin, vol. 64, No. 9, (1985), pp. 1240-1244.

American Ceramic Society Bulletin, vol. 64, No. 5, 1985, pp. 719-723 (Brun et al.).

*Primary Examiner*—James Derrington

*Attorney, Agent, or Firm*—Sughrue, Mion, Zinn Macpeak & Seas

[57] ABSTRACT

In a hot isostatic pressing (HIP) method, only the probe of a dilatometer is set in the pressurized heating space of the HIP apparatus, and the probe is attached to a test piece having a greater specific surface area made of the same material as the body to be treated. The test piece is treated by HIP together with the body to be treated, and the beginning of the contraction of the test piece is detected by the dilatometer. Then, the body is densified by keeping the pressure and the temperature not lower than those at the beginning of contraction of the test piece. According to the method of the invention, since suitable HIP treating conditions are determined immediately, each body to be treated can be treated by only one HIP suitably without repeating the troublesome HIP process. Also, since the body can be treated by HIP without elevating the temperature beyond the necessary temperature, the crystal grain growth of the body to be treated can be inhibited.

5 Claims, 1 Drawing Sheet

HOT ISOSTATIC PRESSING METHOD

BACKGROUND OF THE INVENTION

1. Field of the Invention

This invention relates to a hot isostatic pressing (HIP) method for densifying a metal or ceramic porous body by subjecting it to a high pressure, high temperature gas.

2. Description of the Prior Art

The HIP method is a technique to press a body to be treated isostatically using a high pressure, high temperature gas as the pressing medium. It is known to prepare a dense sintered body containing few pores by treating a porous body such as a metal or ceramic powder sealed in a capsule or a sintered body of a powder by HIP. Heretofore, the optimum HIP conditions to achieve the densification of a porous body were determined by repeating HIP treatment with changing the treating conditions. Each treating condition was evaluated by measuring the density and, if necessary, further incorporating the observation of the texture and the measurement of the strength. Such a method was troublesome, requiring labor and time.

In order to reduce the trial and error times and to determine the optimum HIP conditions efficiently, McCoy et al. devised a special HIP apparatus including a dilatometer to measure the volume change of a sample during HIP treatment (Am. Ceram. Soc. Bull., vol. 64, No. 9, pp 1240–1244, 1985). In the HIP apparatus, a sample table and a probe of the dilatometer is set in the pressurized heating space. The probe is connected with a differential transformer set at a low temperature portion on the outside of the space. When a test piece is put on the sample table, the volume change of the test piece is transmitted from the probe to the differential transformer to detect the expansion or contraction of the test piece by the output. In the HIP apparatus, the subject to be measured is the dimensional change of a test piece. McCoy et al. used a column-shaped alumina molded body sealed in a stainless steel capsule as a test piece, and measured the variations with time of the expansion or contraction quantity of the test piece in various pressure elevation and temperature elevation patterns by this apparatus. Based on the measured results, the pressure and temperature necessary for the densification of the alumina molded body were determined. The determined conditions were applied to the HIP treatment of a big alumina molded body, and a suitable HIP treatment was made possible without repeating trial and error. However, in the above conventional method using a dilatometer, it is necessary to repeat HIP treatment at least twice, i.e., one HIP treatment of a test piece and the HIP treatment of the object to be treated.

SUMMARY OF THE INVENTION

An object of the invention is to provide a method capable of conducting a suitable HIP for a body to be treated by only one HIP treatment.

The inventors investigated in order to develop a HIP method capable of densifying a metal or ceramic porous body securely in a simple process, and completed a hot isostatic pressing method which comprises placing a body to be treated by the hot isostatic pressing method in the pressurized heating portion of a hot isostatic pressing apparatus where a probe portion of a dilatometer is set in the pressurized heating portion and attaching a test piece having a greater specific surface area than the body to be treated to said probe portion, pressurizing and heating the pressurized heating portion of the hot isostatic pressing apparatus, detecting the beginning of contraction of the test piece by the dilatometer, and keeping a pressure and a temperature not lower than those at the beginning of contraction of the test piece for a prescribed time. They found that the aforementioned object can be achieved by the above method to complete the present invention.

DETAILED DESCRIPTION OF THE INVENTION

Figure 1:
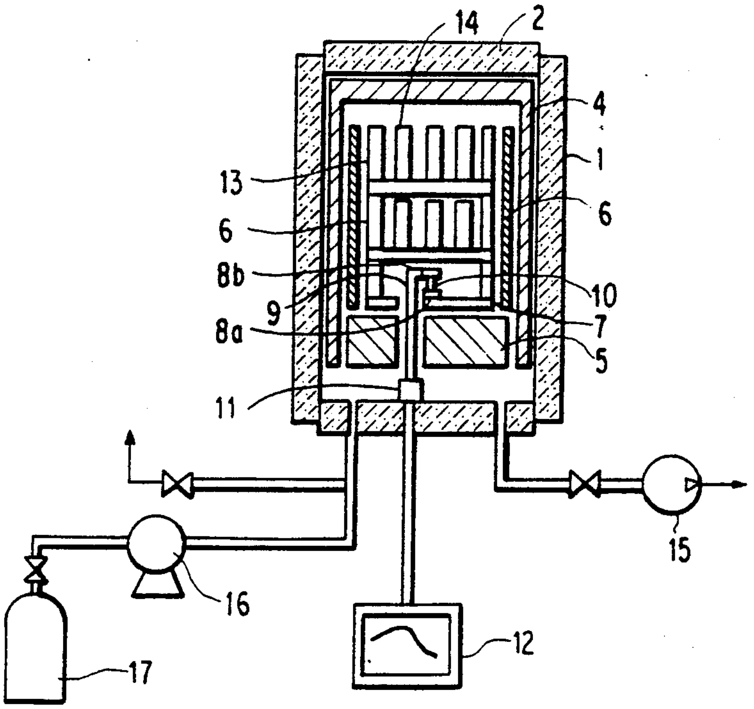
FIG. 1 is a sectional view of an HIP apparatus used for the method of the invention and FIG. 2 is a graph showing a dimensional change of an test piece, a gas pressure change and a temperature change with time during an HIP treatment.

The HIP apparatus used for the method of the invention may be the same as a known one except that the probe portion of the dilatometer is set in the pressuring heating portion. That is, the pressure vessel is provided with a heat insulator at the inside of the pressure vessel, and with a space capable of heating and pressuring at the inside of the heat insulator.

The dilatometer detects the expansion and contraction of a test piece, and is composed of a probe portion which holds the test piece to transmit the movement of the expansion and contraction of the test piece to a differential transformer, the differential transformer converts the movement of the expansion and contraction of the test piece into an electric signal and a connecting portion transmits the movement of the probe portion to the differential transformer. The holding means of the test piece in the probe portion is not restricted, and it is sufficient that the probe portion has the structure capable of transmitting the movement due to the expansion and contraction of the test piece to the differential transformer.

The body to be treated is placed in the HIP apparatus, and the test piece is attached to the probe portion of the dilatometer. The body to be treated and the test piece is a molded body or a sintered body of metal or ceramic containing pores, and the test piece should be the same material as the body to be treated. The metal includes cemented carbide, high speed steel, die steel, stainless steel, nickel alloy, titanium alloy and molybdenum alloy, and the ceramic includes oxides such as alumina, zirconia and ferrite, nitrides such as silicon nitride, aluminum nitride and titanium nitride, carbides such as silicon carbide, chromium carbide and titanium carbide, carbonitrides such as titanium carbonitride and borides such as titanium diboride and zirconium diboride. The specific surface area (surface area per unit weight or unit volume) of the test piece should be greater than that of the body to be treated, preferably by more than 1.5 times that of the body to be treated.

In order to densify the body to be treaed by a gas pressure in the HIP treatment, i.e., in order to apply an isostatic pressure onto the surface of the body to be treated, it is necessary that gas does not enter into the body to be treated. When the body to be treated has only closed pores not open to the outside, it can be subjected to the HIP treatment as it is. When a sintered body has a density of more than 92% of the theoretical density, it corresponds to the above body capable of being subjected to the HIP treatment as it is while when the body to be treated contains pores open to the outside, it is sintered until the density is beyond 92% of the theoretical density. The sintering may be conducted using a sintering furnace, or by heating in the HIP apparatus prior to pressing. In the latter case, it is possible to check whether pressure can be applied or not by detecting the contraction of the test piece accompanied with sintering by the dilatometer. Another method to process the body containing open pores is to seal it in a capsule. The capsule is necessarily softened sufficiently so as to follow the contraction of the body at the temperature where the contraction of the body really occurs, but it should not be softened too much like flowing to expose the body. The capsule may be made of a metal or a ceramic which satisfies the above conditions, and a suitable material is selected from mild steel, stainless steel, tantalum, niobium, borosilicate glass, aluminosilacate glass, silica glass, etc., according to the HIP treatment temperature or the like.

When the body to be treated and the test piece are put in the HIP apparatus, pressing and heating are started. Their conditions are set according to the kind of the body to be treated or the like. Then, the contraction of the test piece is detected by the dilatometer. The contraction detected by the dilatometer also occurs due to the volume change accompanied with a phase transition of the test piece. For example, zirconia transforms from monoclinic crystal structure to tetragonal crystal structure at about 1,000° C., and at that time, contraction occurs, while the contraction due to HIP treatment begins near 1,400° C. It is necessary not to misread the contraction due to phase transition being due to pressing and heating. However, since the contraction due to phase transition is usually known, it can be discriminated easily from the contraction due to pressing and heating.

When the contraction of the test piece is detected by the dilatometer, the pressure and the temperature are kept not lower than those at the beginning of the contraction for a suitable time to densify the body to be treated. At least either of the pressure or the temperature is preferably kept higher than it is at the beginning of the contraction. The gas pressure is preferably kept higher than the pressure at the beginning of the contraction by 10 to 1,000 kg/cm$^2$, particularly 50 to 200 kg/cm$^2$, while it is a matter of course that the gas temperature should be lower than the melting point of the body to be treated, and the gas temperature is preferably kept higher than the temperature at the beginning of the contraction by 10 to 100° C., particularly 10 to 30° C. The keeping time is usually a necessary time for the densification to proceed sufficiently, and it is determined according to the kind of the body to be treated and the like. For example, when a high strength material is produced, it is necessary to densify while inhibiting the growth of crystal grains as much as possible. In this case, the crystal grain growth can be inhibited by measuring the pressure at the beginning of the contraction and the temperature at the beginning of the contraction based upon pressing and heating, and setting the maximum gas pressure higher than the pressure at the beginning of the contraction and setting the difference between the maximum temperature and the temperature at the beginning of the contraction at less than 50° C., after the contraction begins.

After the densification is finished, the pressure and the temperature are lowered to complete the HIP treatment.

In the method of the invention, the test piece can be treated by HIP under the same conditions as the body to be treated by setting the probe portion of the dilatometer in the HIP apparatus. The state of the body to be treated can be predicted by using the test piece composed of the same material as the body to be treated, and the variation of the test piece with temperature occurs prior to the variation of the body to be treated by rendering the specific surface area of the test piece greater than the body to be treated. That is, heat is transferred from the outside to the body to be treated through conduction, convection or radiation, and since the rate of variation in temperature of the body to be treated is governed by the specific surface area of the body to be treated, it is possible that the variation with time of the test piece having a greater specific surface area precedes that of the body to be treated.

According to the method of the invention, since suitable HIP treating conditions are determined immediately, each body to be treated can be treated by only one HIP suitably without repeating the troublesome HIP process. Besides, since the body can be treated by HIP without elevating the temperature beyond the necessary temperature, the crystal grain growth of the body to be treated can be inhibited. The detection of the point to begin the contraction, the determination of the pressing and heating conditions and their performance can be automated.

EXAMPLES

A HIP apparatus used for the method of the invention is shown in FIG. 1. In this apparatus, a pressure vessel is composed of a cylinder 1, an upper cover 2 and a lower cover 3, and it is provided therein with a heat-insulating portion composed of a heat-insulating mantle 4 and a lower heat insulating layer 5. The inside of the heat-insulating portion is the pressurized heating space to treat the body to be treated 14, and a heater 6 is set therein. The bodies to be treated 14 are arranged in a sample case 13, and placed in the pressurized heating space. A support table 7 for the bodies to be treated 14 is placed at the bottom, i.e., on the lower heat insulating layer 5. The probe portion of the dilatometer composed of a fixed portion 8*a* and a movable portion 8*b* is disposed on the support table 7, and the connecting portion 9 penetrates the lower heat insulating layer 5 and the support table 7. The test piece 10 is nipped by the fixed portion 8*a* and the movable portion 8*b*, and the expansion and contraction of the test piece 10 is detected by a differential transformer 11 put on the underside cover 3 as the movement of the movable portion 8*b* in the vertical direction occurs.. The vertical movement is converted to an electric signal by the differential transformer 11, and the electric signal is continuously recorded by the recorder 12. The inside of the pressure vessel can be made put under vacuum by the vacuum pump 15 and can be pressed by introducing an inert gas from the gas cylinder 17 through the compressor 16.

The test piece 10 prepared was a piece of an alumina sintered body having a size of 10 mm in diameter and 12.5 mm in length and a density of 3.75 g/cm$^3$, and the bodies to be treated 14 prepared were 10 pieces of an alumina sintered body having a size of 50 mm in diameter and 80 mm in length and a density of 3.75 g/cm$^3$. The specific surface area of the test piece was 0.48

$cm^2/cm^3$, and that of the body to be treated was 0.15 $cm^2/cm^3$. They were placed in the pressurized heating space of the HIP apparatus.

Figure 2:
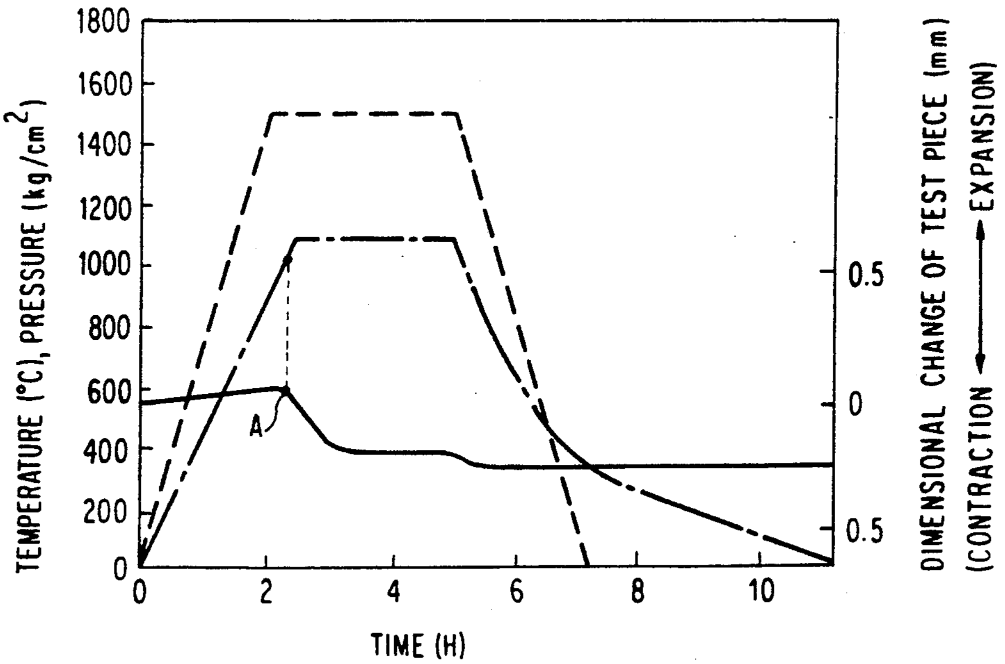

Prior to the HIP treatment, the air in the pressure vessel was exhausted by the vacuum pump 15. Argon gas was supplied from the gas cylinder 17 to the pressure vessel through the compressor 16, while heating was started by applying an electric current to the heater 6. The pressure change (broken line) and the temperature change (dashed line) of the pressurized heating space and the dimensional change of the test piece (full line) measured by the dilatometer are shown in FIG. 2. As shown in the Figure, the pressure and the temperature were elevated to 1,500 $kg/cm^2$, 900° C. for 2 hours. Then, the pressure was kept at 1,500 $kg/cm^2$, and the temperature was further elevated. The beginning of the contraction of the test piece was found at 1,060° C., indicated in FIG. 2 as the point A. Thereupon, the temperature was kept at 1,090° C. and the contraction of the test piece was finished after about 1.5 hours. The pressure and the temperature were further kept at 1,500 $kg/cm^2$ at 1,090° C. for 1.5 hours, and then, the gas was gradually released to ordinary pressure for 2.2 hours, while heating was also stopped, and the pressure vessel was naturally cooled to almost ordinary temperature for 6 hours. As shown in FIG. 2, a further contraction was observed by the temperature decrease due to natural cooling. The HIP treated test piece was contracted by 0.21 mm in the longitudinal direction, and the density was elevated to 3.99 $g/cm^3$. The density of ten pieces of the HIP treated bodies was 3.99 $g/cm^3$, being consistent with the test piece.

I claim:

1. A hot isostatic pressing method which comprises placing a body to be treated by the hot isostatic pressing method in a pressurized heating portion of a hot isostatic pressing apparatus where a probe portion of a dilatometer is set in the pressurized heating portion and attaching a test piece having a greater specific surface area than the body to be treated to said probe portion, pressing and heating the pressurized heating portion of the hot isostatic pressing apparatus, detecting the beginning of contraction of the test piece by the dilatometer, and keeping pressure and temperature not lower than those at the beginning of contraction of the test piece for a prescribed time, wherein the test piece and the body to be treated are made of the same material

2. The method of claim 1 wherein the specific surface area of the test piece is greater than that of the body to be treated by more than 1.5 times.

3. The method of claim 1 wherein at least one of the pressure or the temperature is kept higher than the pressure or the temperature at the beginning of the contraction.

4. The method of claim 3 wherein the pressure is kept higher than the pressure at the beginning of the contraction by 10 to 1,000 $kg/cm^2$.

5. The method of claim 3 wherein the temperature is kept higher than the temperature at the beginning of the contraction by 10 to 100° C.

* * * * *